United States Patent [19]

Ito et al.

[11] Patent Number: 5,761,847
[45] Date of Patent: Jun. 9, 1998

[54] PLANT-GROWING SYSTEM AND PLANT-GROWING METHOD

[75] Inventors: Tadashi Ito, Chiba; Shoichi Ishimoto, Kamakura, both of Japan

[73] Assignee: Mikado Chemical M.F.G. Co., Japan

[21] Appl. No.: 715,624

[22] Filed: Sep. 18, 1996

[51] Int. Cl.$^6$ ........................................... A01G 9/02
[52] U.S. Cl. ................................. 47/65.8; 47/66.7
[58] Field of Search ........................... 47/9, 65.8, 66.1, 47/66.7, DIG. 6

[56] References Cited

U.S. PATENT DOCUMENTS

| 4,299,056 | 11/1981 | Towning | 47/65.8 X |
| 5,241,783 | 9/1993 | Krueger | 47/65.8 |
| 5,309,673 | 5/1994 | Stover et al. | 47/65.8 X |
| 5,355,622 | 10/1994 | Isabelle et al. | 47/65.8 |

FOREIGN PATENT DOCUMENTS

| 2666489 | 3/1992 | France | 47/65.8 |
| 2723435 | 12/1977 | Germany | 47/65.8 |
| 2100566 | 1/1983 | United Kingdom | 47/65.8 |
| 3529 | 10/1982 | WIPO | 47/65.8 |
| 2827 | 8/1984 | WIPO | 47/65.8 |
| 494 | 1/1986 | WIPO | 47/65.8 |

*Primary Examiner*—John A. Ricci
*Attorney, Agent, or Firm*—Rogers & Killeen

[57] ABSTRACT

A plant-growing system includes a covering material filled with a substrate for growing plants. The covering material has a bag form or a tubular form and is made of a water-impermeable resin sheet of woven or nonwoven fabric having a basis weight of 20 to 100 g/m$^2$, a visible-ray reflectance of more than 60%, and an air-permeability of 10 to 200 sec/100 cc. Thus, the substrate does not suffer oxygen shortage, thereby promoting healthy growth of plant roots. Excellent air-permeability prevents an excessive rise in moisture and temperature within the plant-growing system. Further, since excess water is drained from the substrate to maintain a constant water level within the substrate, watering is easy to perform, and excess watering does not cause root rot. In a plant-growing method, the plant-growing system is placed on a ground surface while the covering material is held by a metallic part at its bottom as well as at its both side walls or single side wall. Thus, the metallic part keeps the covering material in shape. Further, the plant-growing system may be placed on a ridge formed on ground, whereby water contained in the covering material is divided by the ridge such that water is held along a lower section of each slope of the ridge. Thus, the plant-growing system can be placed stably on an unflat ground.

11 Claims, 6 Drawing Sheets

- 50
- 52
- ← 100cm
- ← 90cm
- ← 10cm
- 60
- 53

- 50
- 51
- 60

PLANT-GROWING SYSTEM AND PLANT-GROWING METHOD

BACKGROUND OF THE INVENTION

1. Field of the Invention

The present invention relates to a plant-growing system and a plant-growing method, and particularly to a plant-growing system for growing flowers such as carnation, prairie gentian, stock, babies-breath, and snapdragon, and agricultural products such as tomato, cucumber, melon, kidney bean, sweet pepper, field pea, *Japanese honewort, Brassica campestris*, and celery, as well as to a plant-growing method which uses the present plant-growing system.

2. Related Art

Conventionally, there is known a plant-growing system which assumes a form of a bag or a tubular container filled with plants growing media.

Such a plant-growing system has the following advantages. Firstly, sterilization of substrates with vapor and fumigation of substrates against plant diseases are easier, as compared with conventional soil culture in the open field and greenhouse. Secondly, the amounts of chemicals used in the fumigation can be decreased. The third advantage of this growing system is a performance of energy saving in the environmental control and crop management.

Another advantages of a plant-growing system facilitates high utilization of agricultural facilities, which is required by the present agriculture. In order to attain high utilization of facilities, the kinds of plants to be grown must be changed in each cropping season, and pH of soil, fertilizer, water content, etc. must be adjusted accordingly. In ordinary soil culture in the open field or the like, some plants require one to drastically change soil conditions immediately before planting. This requires establishment of a non-cultivating period and re-furrowing. By contrast, the use of a plant-growing system allows one to readily switch types of growing media in connection with the switching of the kinds of plants to be grown, and thus is feasible for high utilization of facilities.

A plant-growing system having the above-described advantages is disclosed, for example, in Japanese Patent Application Laid-Open (kokai) No. 2-215322. The disclosed plant-growing system uses as a container material a resin film which is impervious to liquid and air. However, this resin film with poor air-permeability causes an increase in humidity and temperature within the plant growing system, causing disadvantage on growth of a plant due to lack of oxygen around the root. Further, since the plant-growing system has no means for drainage, excess watering raises a problem of root rot. In order to prevent this problem, watering must be performed periodically at an adequate rate, but this is troublesome.

In order to deal with this drainage problem, a plant-growing system having drainage holes in its bottom is disclosed in Japanese Patent Application Laid-Open (kokai) No. 2-20224. However, since this plant-growing system does not hold water therein enough, it must be watered frequently.

As a measure to hold water at the bottom portion of a plant-growing system, Japanese Patent Application Laid-Open (kokai) No. 8-4013 discloses a technique of providing water drainage holes in side walls of a bag which composes a plant-growing system. The upper and lower portions of the bag are different in material; that is, the upper portion is made of a porous resin film or net, and the lower portion is made of a water-impermeable resin seat.

The use of the porous resin film or net for the upper portion provides good air-permeability, but is likely to be influenced by ambient temperature and susceptible to entry of pest insects and pathogenic bacteria. Also, the use of the water-impermeable resin sheet for the lower portion causes poor air-permeability, resulting in increased humidity and temperature within the plant-growing system and thus having an adverse effect on growth of plants.

SUMMARY OF THE INVENTION

In view of the foregoing, it is an object of the present invention to provide a plant-growing system and a plant-growing method which maintain favorable environment for plants growth in the following manner: a sufficient oxygen content is maintained within substrates so as to promote a healthy growth of the roots; watering is simple, and excess watering does not cause root rot; air-permeability is excellent, so that humidity and temperature do not rise excessively within the plant-growing system.

Novel features of the present invention will be described in detail in accompanying claims. The present invention itself, and other objects and advantages of the present invention will be readily understood from the description below.

DESCRIPTION OF THE INVENTION AND PREFERRED EMBODIMENTS

Embodiments of the present invention will now be described with reference to the drawings.

Figure 1:
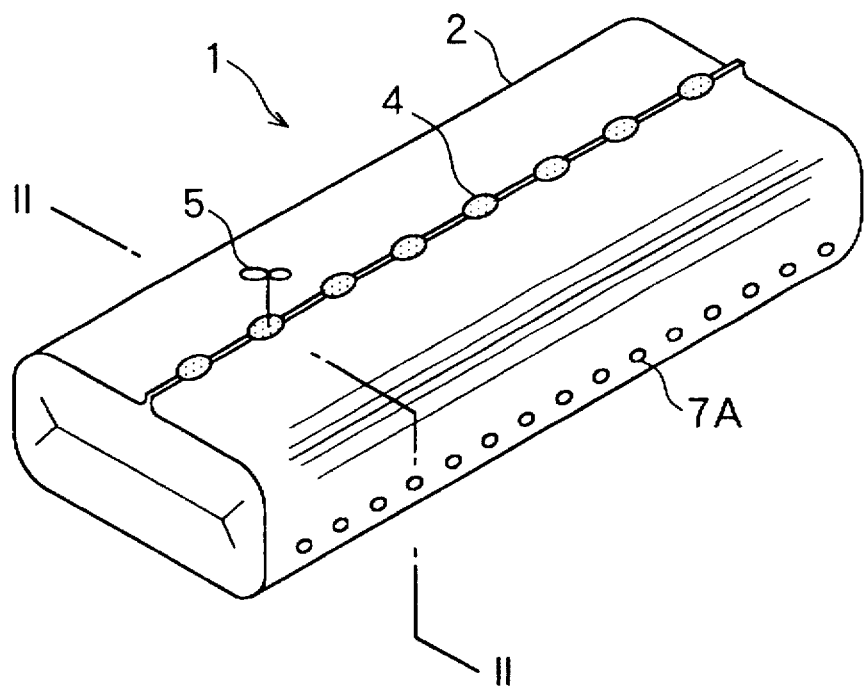
FIG. 1 is a perspective view showing an embodiment of a plant-growing system according to the present invention.
Figure 2:
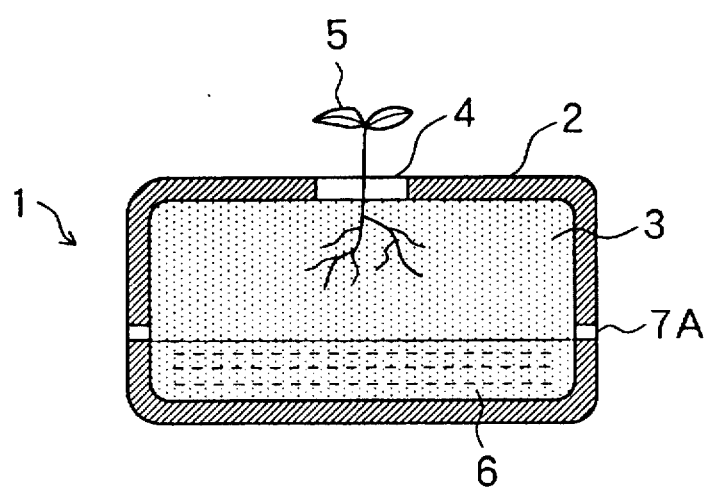
FIG. 2 is a cross-sectional view taken along line II—II of FIG. 1.

FIG. 1 shows a perspective view of an embodiment of a plant-growing system according to the present invention. FIG. 2 shows a cross-section taken along line II—II of FIG. 1.

In FIGS. 1 and 2, reference numeral 1 denotes the plant-growing system wherein a tubular covering material 2 is filled with a substrate (growing media) 3. Reference numeral 4 denotes an opening for planting a plant 5. Reference numeral 6 denotes a water-holding portion for maintaining, at a predetermined level, water which is supplied to the substrate 3.

When the substrate 3 is watered excessively, excess water is drained through many short slits 7A which are provided in each side wall of the covering material 2.

The short slits 7A may be shaped in any form; such as round, rectangular, slit-shaped, or the like. The short slits 7A, if round as shown in FIG. 1, preferably have a diameter of 0.5 to 10 mm. The short slits 7A are arranged on each side wall of the covering material 2 in a longitudinal straight line which is located at a predetermined height, preferably 5 to 30 mm high, above the bottom of the covering material 2. Thus, the water level of the water-holding portion 6 is maintained at 5 to 30 mm above the bottom of the covering material 2.

The short slits 7A are arranged at an adequate pitch in a longitudinal direction. If the short slits 7A are arranged too densely, water will drain too quickly so that the water cannot be uniformly supplied throughout the plant-growing system 1. If they are arranged too sparsely, the plant-growing system 1 will become too moist. Hence, the short slits 7A are required to arrange at a pitch of 50 to 100 cm.

According to the present invention, the water-holding portion 6 holds water required for growing plants. Also, excess water drains away so as to maintain a predetermined water level, i.e. a predetermined water quantity, in the water-holding portion 6.

Due to the presence of the water-holding portion 6, roots of the plant 5 are always supplied with water. Further, since water is held at a predetermined level in the water-holding portion; i.e. since water is limitedly held in the shallow water-holding portion 6, root rot,which is usually caused by insufficient oxygen supply does not take place.

The water-holding portion 6 is preferably 5 to 30 mm deep (5 to 30 mm high above the bottom of the covering material 2). This depth will allow continuous water feed to plant roots if the covering material 2 is sufficiently watered. The water surface in the water-holding portion 6 may be located 10 to 100 mm below the bottom ends of plant roots. Water will reach the plant roots by capillarity within the substrate.

In the present invention, in order to replenish the water-holding portion 6 with water, water may be introduced by an irrigation tube, or water may be sprinkled over the plant-growing system 1.

In the present invention, the covering material 2 is made of a water-impermeable resin sheet of woven or nonwoven fabric having a weight of 20 to 100 g/m$^2$, a visible-ray reflectance of more than 60%, and an air-permeability of 10 to 200 sec/100 cc.

If the basis weight is less than 20 g/m$^2$, the sheet will be too week to be used as a plant-growing sheet, particularly as that of the present embodiment which is formed into a tubular covering material to be filled with substrate, and will deteriorate in visible-ray reflectance. On the contrary, if the basis weight exceeds 100 g/m$^2$, a required air-permeability will not be provided, and cost will increase. Thus, the basis weight is recommended to be 30 to 60 g/m$^2$.

If the visible-ray (wavelength: 400 to 800 nm) reflectance is less than 60%, a roots-zone temperature cannot be maintained 5° to 7° C. below the ambient temperature. In the present invention, the visible-ray reflectance is preferably 75 to 100%. The reflection rate will be measured by a integral-method type Spectrophotmeter (model U-3210, product of Hitachi,Ltd.).

If air-permeability (as measured by the Gale method of JIS P8117) is less than 10 sec/100 cc, pest insects, pathogenic bacteria and fungi will readily enter through the sheet, and the sheet will fail to maintain a required strength and a required high visible-ray reflectance. On the contrary, if air-permeability exceeds 200 sec/100 cc, a heat radiation effect through water evaporation cannot be expected.

As plant-growing substrates used in the present invention, there may be used singly or in combination plant growing materials such as peat moss, rice straw, chaff charcoal, leaf substrate, bark of Japanese cypress or Japanese cedar, sawdust, charcoal powder, and sphagnum moss; moreover, at least one of mineral substrates such as gravel, sand, vermiculite, red clay, and Kanuma soil may be preferably mixed and aged.

In order to prevent an excessive rise of roots temperature, it is preferred to use the substrate having an adequate water content or sufficient porosity. Porosity may be formed in the substrate by mixing clay soil, pumice, or volcanic ash soil thereinto.

If geographically available, oyster shell, crustacean shell, clashed bone, fish cake, or the like may be added as a substrate material. Also, fertilizer, insecticide, a heat reserving agent, or the like may be added to the substrate. It is particularly preferred to add to the substrate slow-release fertilizer and solid organic mixed fertilizer.

Preferably, before being used in the above-described substrate, the media is sterilized or fumigated so as to prevent plant disease. In contrast with conventional open culture and growing in greenhouse wherein soil of an entire plowed ground must be treated, the present invention requires sterilization and fumigation of only soil for use in the substrate. Thus, sterilization or fumigation is easy to perform and requires less labor and cost. Furthermore, consumption of insecticide is lower. It is also preferred to heat-sterilize substrate. Preferably, in case of heat sterilization, solar heat energy is more preferable than fossil fuel (coal, oil, natural gas, etc.).

The substrate prepared as described above is a mixed soil which is excellent in water retentivity, water absorption, water permeability, fertilizer retentivity, air permeability, and safety against disease damage. This substrate contained in a covering material provides effective environments for growing plants. Also, it becomes possible to grow plants only by placing the above-described substrate within the covering material.

Figure 3:
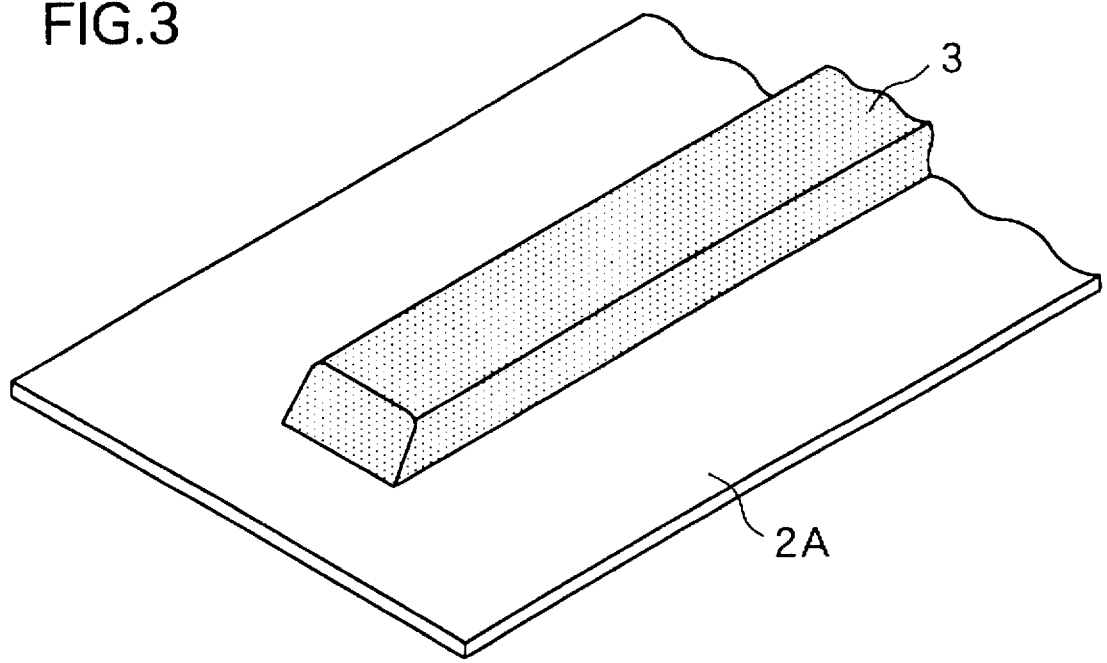
FIG. 3 is a perspective view showing an example of manufacture of a plant-growing system.

The plant-growing system 1 of FIG. 1 is formed in the following manner. As shown in FIG. 3, a water-impermeable resin sheet 2A is spread. The substrate 3 is placed along the centerline of the spread resin sheet 2A. The substrate 3 is wrapped from both sides in the resin sheet 2A. Both side edges of the resin sheet 2A or their adjacent portions are joined (connected) together on the top surface of the substrate 3 along the centerline of the substrate 3. Also, the resin sheet 2A is folded at longitudinal ends of the substrate 3 so as to wrap the longitudinal ends. The side edges of the resin sheet 2A may be joined together by bonding, fusing, stitching, stapling, hooking with wire, or the like.

As described before, preferably, the water-impermeable resin sheet 2A used in the present invention has a basis weight of 20 to 100 g/m$^2$, a visible-ray reflectance of more than 60%, and an air-permeability of 10 to 200 sec/100 cc, and is made of water-impermeable woven or nonwoven fabric which allows water vapor to pass therethrough, but does not allow liquid such as water or liquid fertilizer to pass therethrough. Resins usable in the resin sheet 2A include polyethylene (particularly high-density polyethylene), polypropylene, polyester, polyamide, etc., and their copolymers. These resins may be used singly or in combination. From the viewpoint of strength, durability, and cost, a high-density polyethylene resin sheet is preferred.

The above-described resin sheet is preferably of woven or nonwoven fabric whose outer surface is of a white or silver color so as to adjust temperature of the substrate 3 for protection of the substrate 3 from high temperatures in summer and whose inner surface is colored in a light-absorbent color. Light-absorbent colors include black, blue, red, etc.; particularly, black is preferred because of its excellent light-shielding property.

When the substrate 3 is wrapped in the resin sheet 2A as shown in FIG. 3, it is preferable that the substrate 3 be placed on the inner surface of the resin sheet 2A colored in a light-absorbent color (on the top surface of the resin sheet 2A in FIG. 3), so that the white/silver surface (the back surface of the resin sheet 2A in FIG. 3) becomes an outer surface after wrapping. More preferably, the resin sheet 2A is of woven or nonwoven fabric having a visible-ray transmittance of less than 10%.

The outer white/silver surface of the resin sheet 2A reflects visible rays in diffusive light, thereby providing the effect of maintaining the wrapped plant-growing system at lower temperatures. That is, the plant-growing system is prevented from inducing heat injury to the plant roots. Also, this outer white/silver surface reflects ultraviolet rays at a relatively high reflectance and provides an effect that alate plant louse, thrips, and the like are less likely to come flying, thereby minimizing occurrence of viral disease damage.

The light-absorbent colored layer on the inner surface of the resin sheet 2A is expected to absorb as much light as possible so as to prevent light penetration to the substrate 3, thereby preventing the growth of moss, alga, and weeds in a space between the substrate 3 and the inner surface of the resin sheet 2A and thus promoting better growth of roots.

The above-described nonwoven sheet having a white/silver surface and a light-absorbent colored surface is manufactured by any of the following methods.

(a) One side of white nonwoven fabric which is manufactured by flash-spinning high-density polyethylene is solid-printed using black ink such as black gravure ink, black offset ink, black screen printing ink, or the like.

(b) One type of nonwoven fabric is manufactured by flash-spinning high-density polyethylene which contains 3 to 15 wt. % of white pigment, such as titanium oxide or barium sulfate, and aluminum powder. Another type of nonwoven fabric is manufactured by flash-spinning high-density polyethylene which contains 0.5 to 5 wt. % of carbon black. These types of nonwoven fabric are bonded together.

(c) The back side of white or silver nonwoven fabric is solid-printed using black ink such as black gravure ink, black offset ink, black screen printing ink, or the like.

(d) An anchor coat is applied to the surface of black nonwoven fabric, and then aluminum is vapor-deposited thereon.

(e) A white coating or aluminum coating is applied to the back side of black nonwoven fabric, and then dried.

Figure 4:
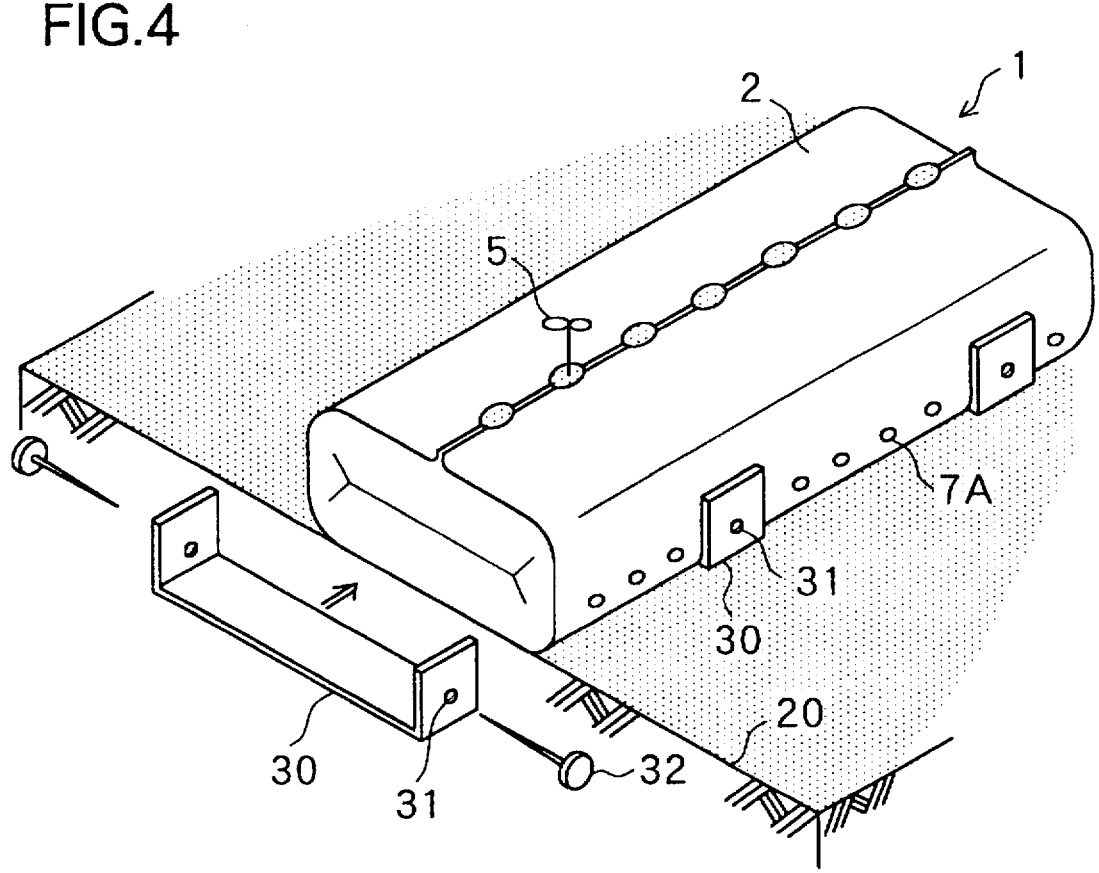
FIG. 4 is a perspective view showing an embodiment of a plant-growing method according to the present invention.

Next, the short slits 7A are formed in the covering material 2 in the following manner. As shown in FIG. 4, a squarish U-shaped metallic part 30 is fit to the covering material 2, and then a pointed member 32 is stuck into the covering material 2 through a slit 31 formed in the metallic part 30, thereby forming a plurality of short slits 7A in the covering material 2 at a predetermined height as well as at a predetermined pitch.

The short slits 7A may be formed using only the pointed member 32 without using the metallic part 30. However, in order to arrange the short slits 7A precisely at a predetermined height, use of the metallic part 30 is preferred.

The short slits 7A maybe formed while the covering material 2 is being formed or immediately after the covering material 2 is formed. Alternatively, the short slits 7A may be formed at a certain point of time while the plant-growing system 1 is being used, for example, after plants are placed in the plant-growing system 1.

Further, the above-mentioned metallic part 30 is very effective for keeping the plant-growing system 1 in shape so as to maintain a plurality of short slits 7A at a fixed height. That is, the metallic part 30 holds the covering material 2 at its bottom as well as at its side walls to thereby retain its shape, so that the short slits 7A can be maintained at a fixed height. When the metallic part 30 is used as shown in FIG. 4, the pointed member 32 may be left stuck into the covering material 2 or removed. In order to prevent substrate from flowing out, the pointed member 32 may be left stuck. In this case, a "water passage" may be formed in the pointed member 32 as adequate. A plurality of metallic parts 30 may be fit to the covering material 2 at a predetermined pitch in a longitudinal direction of the covering material 2.

Figure 5:
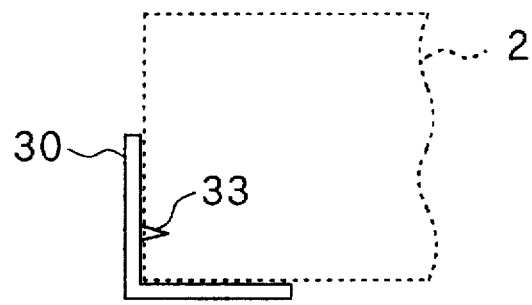
FIG. 5 is a cross-sectional view of a main portion showing an example of a metallic part.
Figure 6:
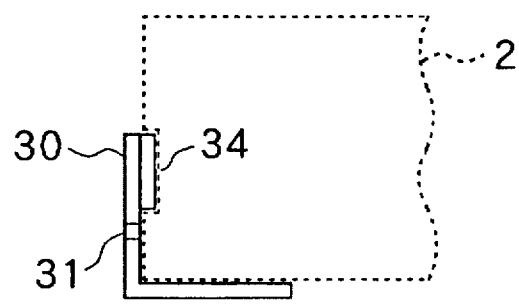
FIG. 6 is a cross-sectional view of a main portion showing another example of the metallic part.

As shown in FIG. 5, an L-shaped metallic part having a projection 33 on its side wall may be used in place of the metallic part 30. A plurality of projections 33 may be formed on the side wall in a vertical direction in FIG. 5. Alternatively, as shown in FIG. 6, an L-shaped metallic part having a slit 31 in its side wall may be used. This L-shaped metallic part is attached to the covering material 2 using double coated tape 34 as illustrated.

Figure 7:
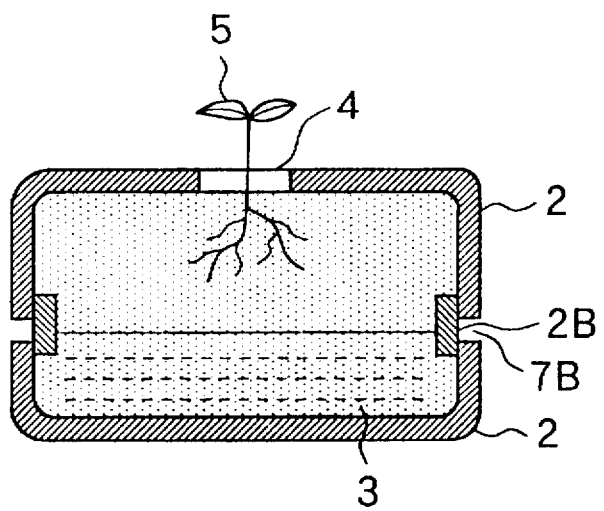
FIG. 7 is a cross-sectional view showing another embodiment of the plant-growing system.

FIG. 7 shows another embodiment of the plant-growing system of the present invention. In this embodiment, slit-shaped openings 7B in place of the short slits 7A are formed in each side wall of the covering material 2. The openings 7B are sealed with a water-permeable root-stopping sheet 2B, which allows water to permeate, but does not allow plant roots to pass therethrough. Excess water drains through the water-permeable root-stopping sheet 2B.

The water-permeable root-stopping sheet 2B does not allow plant roots to come out from the covering material 2. This prevents pathogenic bacteria and fungi from entering into the covering material 2 from unsterilized or unfumigated outside soil by way of roots which would otherwise project outward. Also, if a plant spreads its roots outside a plant-growing system, the spreading roots must be collected to clean the plant-growing system after growing is completed. Thus, in order to facilitate post-growing work, it is necessary to take a measure to prevent plant roots from projecting from the covering material 2.

The water-permeable root-stopping sheet 2B may be of woven or nonwoven fabric or felt which is made primarily of water-permeable thermoplastic resin fiber. Examples of such thermoplastic resins include polyethylene (particularly high-density polyethylene), polypropylene, polyester, polyamide, etc., and their copolymers. These resins may be used singly or in combination. From the viewpoint of strength and durability, polyester is preferred. Alternatively, the water-permeable root-stopping sheet 2B may be made of natural fiber.

Water-permeability of the water-permeable root-stopping sheet 2B is defined as a flow rate of water which permeates through a sample sheet which is prepared from the water-permeable root-stopping sheet 2B and which has a predetermined area and thickness. The water-permeability is measured using a device shown in FIGS. 8 and 9.

Figure 8:
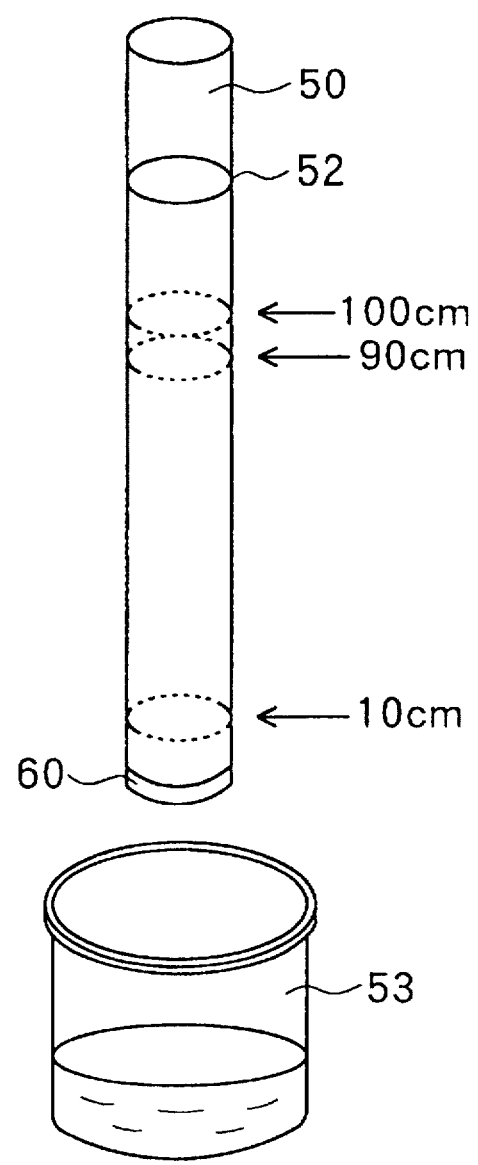
FIG. 8 is a perspective view showing a device for defining water permeability.
Figure 9:
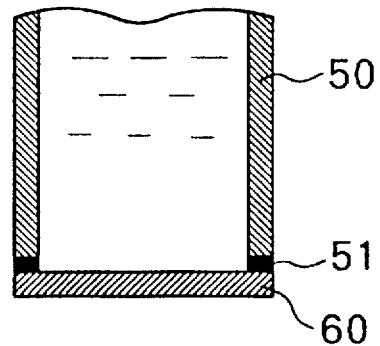
FIG. 9 is an enlarged cross-sectional view of a main portion of the device shown in FIG. 8.

That is, as shown in FIGS. 8 and 9, a sample sheet 60 is bonded using adhesive 51 to the bottom end of a glass tube 50 having an inner diameter of 20 mm. Water is poured into the upright glass tube 50 until a water column surface 52 exceeds a marked line of 100 cm. Water is allowed to permeate through the sample sheet 60 and to drop into a catching vessel 53. Rate of water permeation begins to be measured when the water column surface passes the 100 cm line.

As the water-permeable root-stopping sheet 2B, a sheet is used which has a water-permeability such that the time required for the water column surface 52 to drop from the 100 cm line to a 90 cm line is within 60 minutes as measured by the above-described method, preferably within 30 minutes, more preferably within 10 minutes.

In order to attain root-stopping function, the water-permeable root-stopping sheet 2B is densely woven, or when nonwoven, fibers are densely arranged and overlap each other.

The root-stopping performance is not directly related to water-permeability, but is generally represented by rate of water permeation. To provide a sufficient root-stopping function, a sheet is used which has a water-permeating speed such that the time required for the water column surface 52 to drop from the 100 cm line to a 10 cm line is equal to or greater than 1.5 sec as measured by the above-described method, preferably equal to or greater than 3 sec.

Preferably, the water-permeable root-stopping sheet 2B has a basis weight of 60 to 200 $g/m^2$ as to prevent strength and visible-ray reflectance from deteriorating.

In the present invention, the water-permeable root-stopping sheet 2B to cover the opening 7B may be attached to the covering material 2 either from inside as illustrated or from outside.

Alternatively, it is possible to form short slits short slits, as shown in FIG. 1, and to then attach a water-permeable root-stopping sheet to the covering material 2 so as to seal the short slits.

The plant-growing method of the present invention will next be described. FIG. 4 shows an embodiment of the plant-growing method of the present invention. As shown in FIG. 4, the covering material 2 is placed on a ground surface 20 while the covering material 2 is held by the metallic part 30 at its bottom as well as at its both side walls or a single side wall. Use of the metallic part 30 in this manner is preferred because the covering material 2 can be kept in shape.

Another embodiment of a plant-growing method of the present invention will now be described with reference to FIG. 10.

Figure 10:
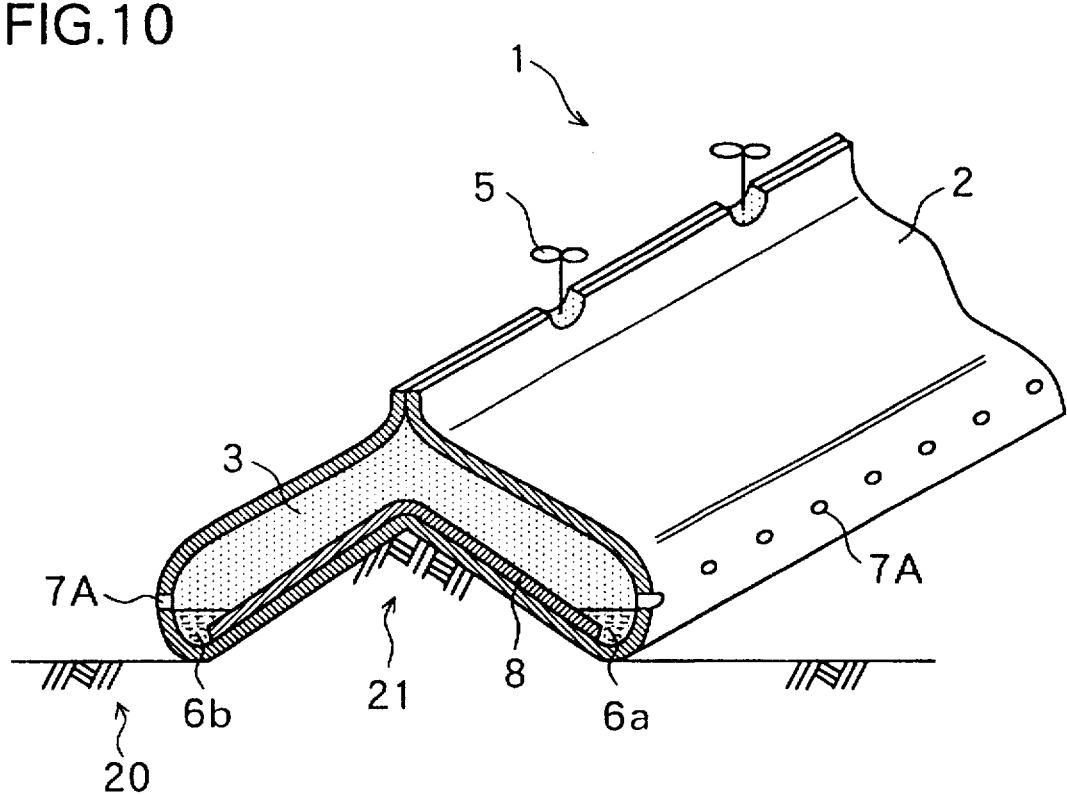
FIG. 10 is a perspective view showing another embodiment of the plant-growing method.

In FIG. 10, reference numeral 20 denotes a ground surface, and reference numeral 21 denotes a ridge. When a plant-growing system 1 is placed on the ridge 21, the plant-growing system 1 rests on both slopes of the ridge 21. As a result, water contained in the covering material 2 is divided by the ridge 21 such that water-holding portions 6a and 6b are formed along the lower sections of both slopes of the ridge 21. The configuration shown in FIG. 10 forms separate water-holding portions and makes the substrate 3 thinner, resulting in an advantage of establishing good air-permeability around roots of a plant 5. That is, roots of the plant 5 are less likely to be influenced by humidity, thereby maintaining good environment around roots of the plant 5.

When the plant-growing system 1 of FIG. 10 is placed on a place, such as a ridge in plowed ground, which is difficult to flatten, the covering material 2 can be positioned because two separated water-holding portions are formed.

A plant-growing system of the present invention can be used on a sloped ground surface or a rugged ground surface in addition to use on the ridge 21 described above.

In FIG. 10, excess water drains through short slits 7A. Alternatively, slit-shaped openings may be formed in place of the short slits 7A in each side wall of the covering material 2. The slit-shaped openings are sealed with a water-permeable root-stopping sheet, which allows water to permeate, but does not allow plant roots to pass therethrough. Excess water drains through the water-permeable root-stopping sheet. Also, the water-permeable root-stopping sheet may be bonded to the covering material 2 so as to seal the short slits 7A therewith.

In the embodiment shown in FIG. 10, a water-holding material 8 is provided on the inner bottom of the covering material 2. One end of the water-holding material 8 is immersed in water in the water-holding portion 6, and the other end extends upward into the substrate 3 located above the water-holding portion 6.

The water-holding material 8 of FIG. 10 assists a water-holding action of the water-holding portions 6a and 6b. The water-holding material 8 is particularly effective when the plant-growing system 1 is to be placed on an unflat ground as shown in FIG. 10. In this case, plants receive water continuously through the water-holding material 8. Preferably, the water-holding material 8 is a sheet made of soft urethane foam, hard urethane foam, phenolic resin foam, urea resin foam, hay, or the like.

Figure 11:
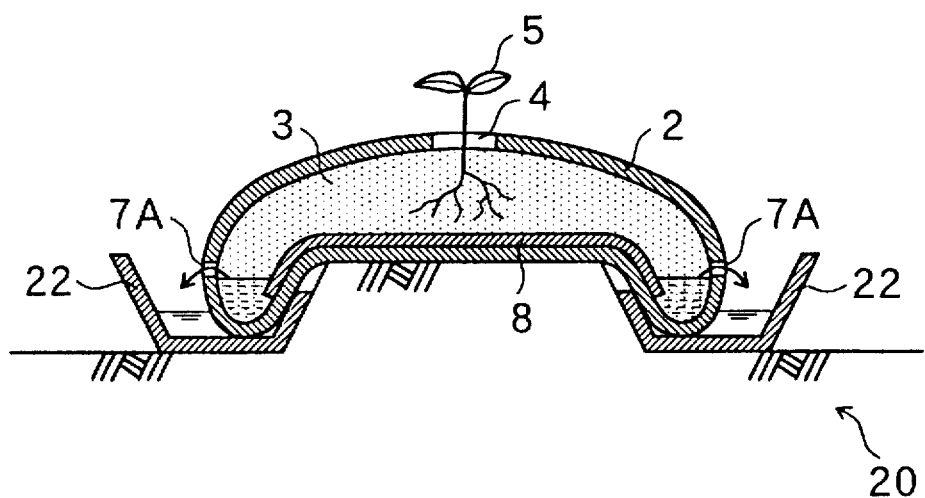
FIG. 11 is a cross-sectional view showing a still another embodiment of the plant-growing method.

In a further embodiment of the plant-growing method of the present invention, as shown in FIG. 11, a water-impermeable gutter member 22 is provided underneath a covering material 2 of a plant-growing system 1 such that the gutter member 22 receives excess water which drains from the covering material 2. The gutter member 22 allows thus-received water to be returned to the plant-growing system 1, thereby effectively recycling water. Since excess water passes through the substrate 3 before it drains from the covering material 2, it contains nutrient elements required for plant growth. Thus, it is preferable that excess water be returned to the plant-growing system 1. Alternatively, a water-impermeable dish-like receiver may be used in place of the gutter member 22.

Figure 12:
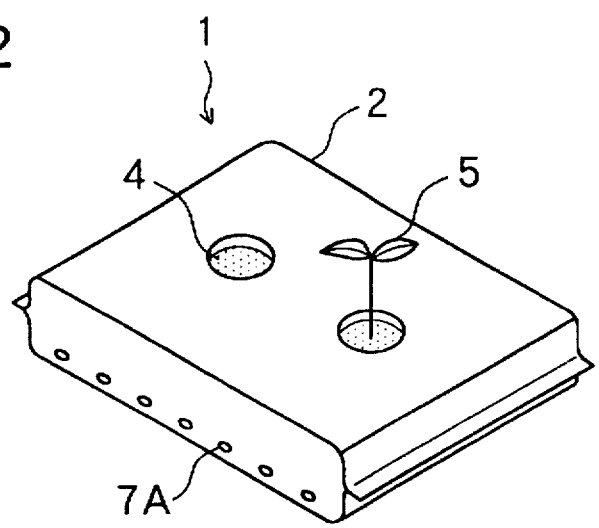
FIG. 12 is a perspective view showing another embodiment of the plant-growing system according to the present invention.

The above-described embodiment uses a tubular covering material, but a covering material of the present invention may be shaped into a bag as shown in FIG. 12. In FIG. 12, the same features as those of FIG. 1 are denoted by common reference numerals, and their descriptions will be omitted.

A plant-growing system of the present invention is used on general open culture ground or in a glass or plastic greenhouse or similar facilities. In addition, this plant-growing system can be used for growing plants at an untillable land such as salt-accumulated land or gravel land, a concrete- or asphalt-paved plot, and the like.

In contrast with an ordinary cultivation bed from which moisture evaporates at a relatively rapid rate, the present invention can utilize water more effectively, and thus can be used for growing plants in dry land or desert. Further, the present invention can be applied to plant-growing on a slope in a mountainous region.

What is claimed is:

1. A plant-growing system comprising a covering material filled with a substrate for growing plants, wherein said covering material has a bag form or a tubular form and is made of a water-impermeable resin sheet of woven or nonwoven fabric having a basis of weight of 20 to 100 g/m$^2$, a visible-ray reflectance of more than 60%, and an air-permeability of 10 to 200 sec/100 cc, said covering material having a passage for draining excess water from said substrate so as to maintain a constant water level within said substrate.

2. A plant-growing system according to claim 1, wherein an outer surface of said covering material is of a white or silver color and an inner surface of said covering material is colored in a light-absorbent color.

3. A plant-growing system according to claim 1, wherein said passage comprising a plurality of short slits formed in each side wall of said covering material so as to allow excess water to be drained through said short slits.

4. A plant-growing system according to claim 1, wherein said passage comprising slit-shaped openings formed in each side wall of said covering material and wherein said slit-shaped openings are sealed with a water-permeable root-stopping sheet which allows water to permeate, but does not allow plant roots to pass therethrough, thereby allowing excess water to be drained through said water-permeable root-stopping sheet.

5. A plant-growing method comprising a step of placing a plant-growing system on a ground surface, wherein said plant-growing system comprises a covering material which is filled with a substrate for growing plants, has a bag form or a tubular form, and is made of a water-impermeable resin sheet of woven or nonwoven fabric having a basis weight of 20 to 100 g/m$^2$, a visible-ray reflectance of more than 60%, and an air-permeability of 10 to 200 sec/100 cc and whose each side wall has a plurality of short slits formed so as to allow excess water to be drained through said short slits in order to maintain a constant water level within the substrate, and wherein said covering material is placed on the ground surface while said covering material is held by a metallic part at a bottom of said covering material as well as at both side walls or a single side wall of said covering material.

6. A plant-growing method according to claim 5, wherein said metallic part has a shape of squarish letter U so as to hold said covering material at a bottom of said covering material as well as at both side walls of said covering material.

7. A plant-growing method comprising the steps of forming a ridge on a ground surface and placing a plant-growing system on the ridge, wherein said plant-growing system comprises a covering material which is filled with a substrate for growing plants, has a bag form or a tubular form, and is made of a water-impermeable resin sheet of woven or nonwoven fabric having a basis weight of 20 to 100 g/m$^2$, a visible-ray reflectance of more than 60%, and an air-permeability of 10 to 200 sec/100 cc and which has a structure that excess water is drained from the substrate so as to maintain a constant water level within the substrate, and wherein water contained in said covering material is divided by the ridge such that water is held along a lower section of each slope of the ridge.

8. A plant-growing method according to claim 7, wherein a plurality of short slits are formed in each side wall of said covering material so as to allow excess water to be drained through said short slits.

9. A plant-growing method according to claim 7, wherein slit-shaped openings are formed in each side wall of said covering material and wherein said slit-shaped openings are sealed with a water-permeable root-stopping sheet which allows water to permeate, but does not allow plant roots to pass therethrough, thereby allowing excess water to be drained through said water-permeable root-stopping sheet.

10. A plant-growing method according to claim 7, wherein one end of a water-holding material is immersed in reserved water, and the other end extends upward into the substrate located above the reserved water.

11. A plant-growing method according to claim 7, wherein a water-impermeable gutter member or dish-like receiver is provided underneath said covering material such that the gutter member or dish-like receiver receives excess water which is drained from said covering material.

* * * * *